Dec. 10, 1940.   W. J. VOIT ET AL   2,224,363
METHOD AND APPARATUS FOR COVERING BALLS
Filed Jan. 24, 1939   2 Sheets-Sheet 1
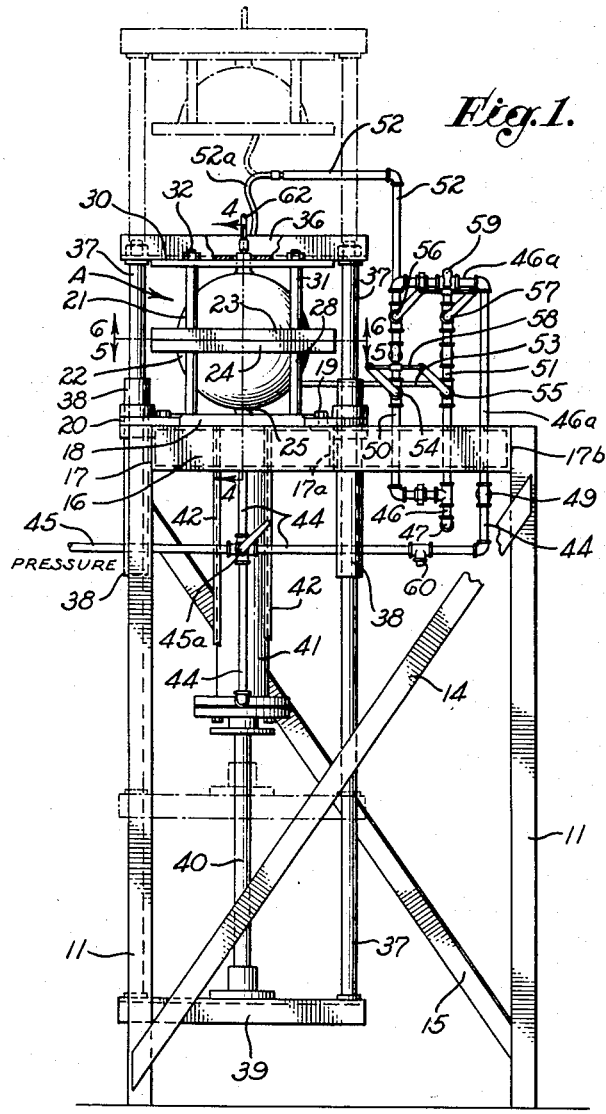
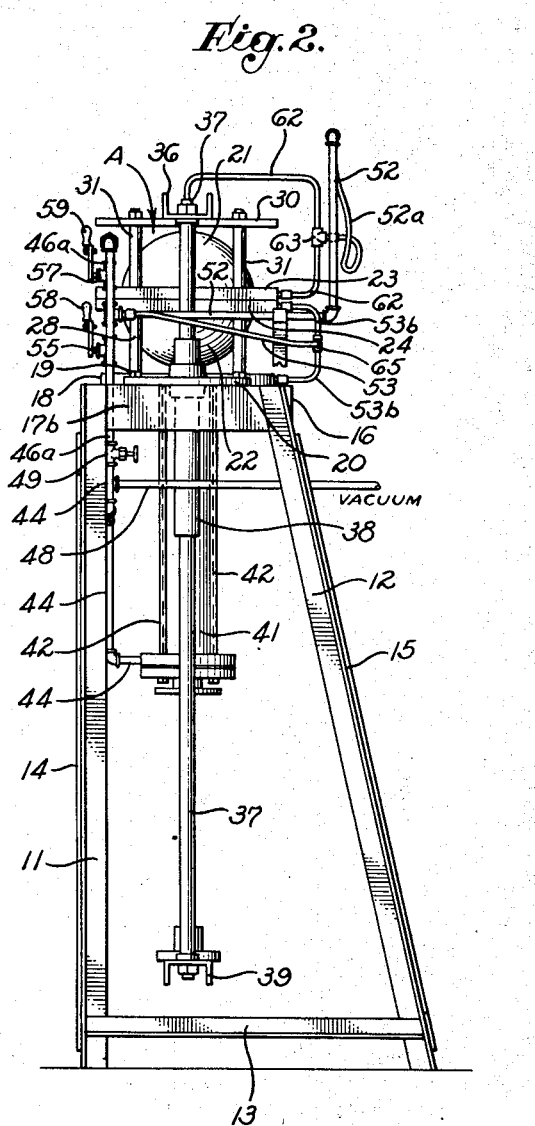
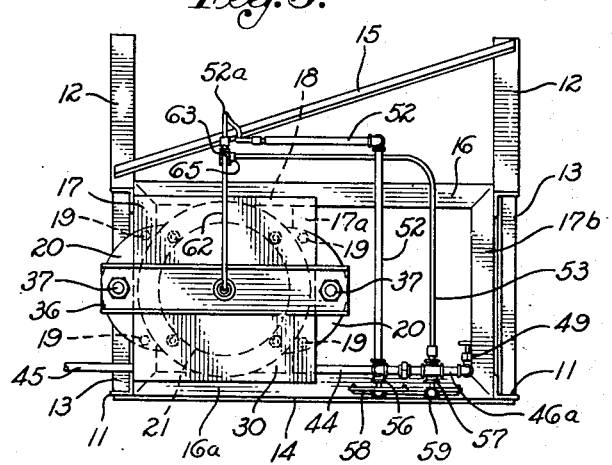
INVENTORS
WILLIAM J. VOIT
LEITH C. WEIMER
BY
HARRIS, KIECH, FOSTER & HARRIS
ATTORNEYS

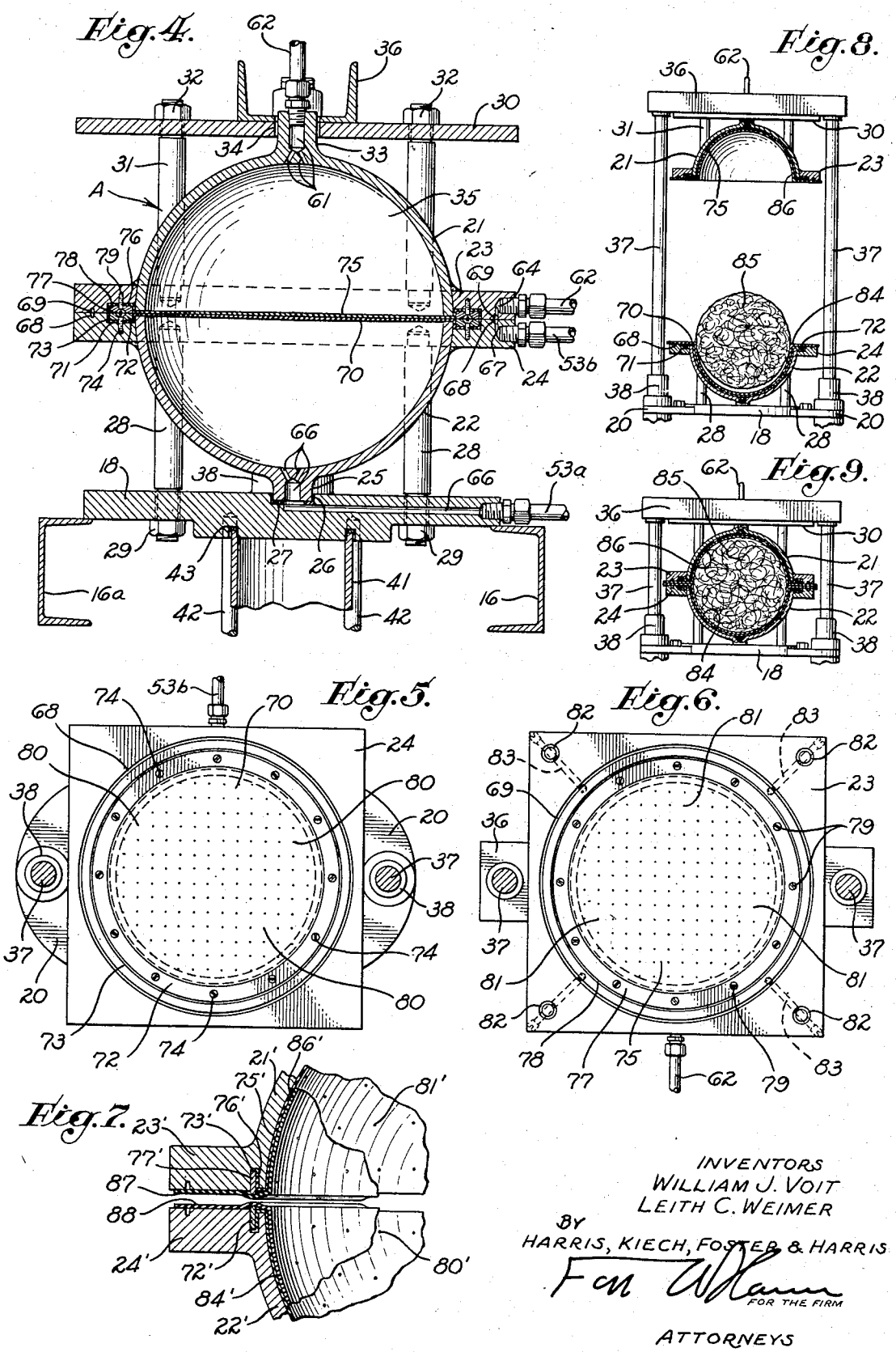

Patented Dec. 10, 1940

2,224,363

UNITED STATES PATENT OFFICE 2,224,363

METHOD AND APPARATUS FOR COVERING BALLS

William J. Voit, Los Angeles, and Leith C. Weimer, Southgate, Calif.; said Weimer assignor to said Voit Application January 24, 1939, Serial No. 252,602

7 Claims. (Cl. 154—16)

This invention relates to a method and apparatus for covering balls, and has as its object to provide a method and machine for applying sheets of rubber or similar material to curvilinear solid objects, as for instance in the process of manufacturing game balls or other objects comprising an enveloping wall or cover of such material. It is especially adapted to the application of a spherical or spheroidal rubber envelope to the core of a baseball of the soft ball type, but is capable of use for many other purposes. While for purposes of illustration only, the invention will be described as embodied in a machine for applying an envelope of sheet rubber to the core of a baseball of the soft ball type, we do not wish the scope of our invention to be limited to such an embodiment.

In the manufacture of baseballs of the kind described in our Patent No. 2,127,487, a cover of rubber is applied to the core. Our application for Patent Serial No. 236,856 describes a baseball which has an inner wall of rubber enveloping a fibrous core, and an outer rubber cover with an intervening wall of fibrous material. Sections or pieces of unvulcanized rubber material for these covers or inner walls are placed in position upon the ball center or core, and the assembled article is placed in a vulcanizing mold, where the rubber is vulcanized into a continuous integral envelope.

It is the object of the present invention to provide a method of and a machine for the application of the sections of rubber to the ball center in preparation for the vulcanizing operation. It is the purpose of the invention to provide a method and a machine which will rapidly and efficiently accomplish this operation.

It is a further object of the invention to provide a method and a machine which will apply the rubber sections in such a manner that the finished envelope shall be of even thickness and without folds or seams or thickened portions. The attainment of such a purpose is of great value in the manufacture of baseballs. If either an inner rubber envelope or a rubber cover, and especially the rubber cover, is of uneven thickness in the finished ball, there follow a number of undesirable results. Balls with covers of varying thickness also develop soft spots. When the ball is compressed in the vulcanizing mold, areas of relatively greater density form in the vicinity of the thickened portions of the cover. In the intervening areas of lesser density the particles of fibrous material of the center are more readily capable of motion with respect to each other under the impacts to which the ball is subjected in play, with the result that these spots become increasingly softer, while the more compact areas tend to retain their original rigidity to a greater degree. Such uneven distribution of the rubber material in the cover causes uneven resiliency, resulting in uncertainty and undesirable variation in the character of the performance of the ball in play. Such uneven thickness also presents an uneconomical use of material. The useful life of the ball is measured by the thinnest portion of its cover. When the cover is worn through at such a thin area, the rubber material in the balance of the cover becomes wasted and of no value.

In the drawings:

Fig. 1 is a front elevation of a machine embodying our invention.

Fig. 2 is an end elevation thereof.

Fig. 3 is a top plan view of the machine.

Fig. 4 is an enlarged vertical section of the former and parts of the machine adjacent thereto, taken along the line 4—4 of Fig. 1.

Fig. 5 is an enlarged horizontal top plan view of the lower half of the former as indicated by the line 5—5 of Fig. 1.

Fig. 6 is an enlarged horizontal bottom plan view of the upper half of the former as indicated by the line 6—6 of Fig. 1.

Fig. 7 is a fragmentary vertical section of a modified form of the former.

Fig. 8 is a vertical elevation of the former and adjacent frame members of the machine, showing the two parts of the former in separated position with a ball placed ready for application of the cover material.

Fig. 9 is a similar view showing the two parts of the former brought together upon the ball.

The supporting frame of the machine consists of front uprights 11, rear uprights 12, lower horizontal braces 13, a front diagonal brace 14, a rear diagonal brace 15, and five upper horizontal rectangularly arranged channel beams 16, 16a and 17, 17a, and 17b. A horizontal plate 18 rests upon the channels 16, 16a and 17, 17a and is bolted to channels 17, 17a at 19, 19. The plate 18 is circular in form with two projecting arcuate shaped ears 20, 20. The bolts 19, 19 pass through these ears 20, 20 and the channels 17, 17a and secure the plate 18 against horizontal displacement.

A former for shaping a rubber cover or envelope upon the ball is generally designated by the letter A. It has an upper half 21 and a lower half 22, each of which is a hemispherical shell, and each of which has welded thereto at its rim a horizontal plate which is designated as 23 in the case of the upper half and 24 in the case of the lower half. The lower shell 22 is provided with a downwardly extending cylindrical boss 25 which extends into a recess 26 in the upper face of the plate 18 and is supported thereon in air-tight relationship with the bottom face of the recess by means of a gasket 27. The shell 22 is held in position upon the plate 18, and the boss 25 is clamped tightly against the plate 18, by means of four stud bolts 28, threaded at their upper ends into the lower face of the plate 24, and secured at their lower ends to the plate 18 by means of nuts 29.

The upper shell 21 is held in permanent vertically spaced relationship with a plate 30 by means of stud bolts 31, which are threaded at their lower ends into the upper face of the plate 23 and secured at their upper ends to the plate 30 by nuts 32. A circular boss 33 projecting from the top of the upper shell 21 projects through an aligned central aperture 34 in the plate 30.

The lower shell 22 is rigidly mounted upon the stationary plate 18. The upper shell is rigidly mounted upon the plate 30 which is vertically movable in such a manner that the upper shell can be placed in contact with the lower shell to form a spherical former chamber 35, or can be elevated above the lower shell for insertion of a ball or ball making material in the former A. To provide for this vertical movement of the plate 30, it is rigidly secured to a cross channel 36, which is in turn rigidly carried by two slide rods 37. These two slide rods are disposed in two sleeves 38 which are secured respectively at the two extremities of the ears 20 of the plate 18, and the rods are tied together at their lower ends by a cross channel 39. A pneumatic plunger rod 40 is carried by the channel 39 midway of the length of the channel. This plunger rod is associated in the usual manner of pneumatic jacks with a pneumatic cylinder 41 which is secured in suspended position to the under face of the plate 18 by means of four rods 42, which have stud threads at their upper ends for engagement with the plate 18. A gasket 43 disposed between the upper end of the cylinder 41 and the plate 18 affords an air-tight seal between these two parts. By means of an air pressure pipe system 44, which is connected to a source of air pressure (not shown) by a pipe 45, and by the operation of a two-way valve 45a which controls the flow of air to the ends of the pneumatic cylinder 41, the plunger rod 40 may be moved vertically up or down to separate or bring together the two shells 21 and 22.

An air vacuum pipe 46, is connected at 47 to a pipe 48 leading to a vacuum pump or vacuum chamber (not shown), and an air pressure pipe 46a is connected through a valve 49 with the pressure pipe 44. The vacuum air pipe 46 is branched to provide two pipes 50, 51, of which 50 is connected by pipe 52 to the upper shell, and 51 is connected by pipe 53 to the lower shell. The branch pipes 50 and 51 are joined at their upper ends where both are connected to the pressure pipe 46a. The connections of the branch pipes 50 and 51 with pipes 52 and 53 are located between the vacuum pipe 46 and the pressure pipe 46a; valves 54 and 55 are provided in branch pipes 50 and 51 respectively, between the vacuum pipe 46 and the connections to pipes 52 and 53; and valves 56 and 57 are provided in branch pipes 50 and 51 respectively, between the pressure pipe 46a and the connections to pipes 52 and 53. Valves 54 and 55 are tied together and operated in unison by a hand lever 58. Valves 56 and 57 are tied together and operated in unison by a hand lever 59. By this arrangement of pipes and valves, either superatmospheric air pressure or subatmospheric air pressure can be applied simultaneously to the two shells 21 and 22. The valve 49 is normally open when the machine is being operated. A relief vent is provided at 60 to prevent the application of sudden excessive pressures to the operating parts of the machine.

The pipe 52 is connected to a flexible air hose 52a. This hose permits movement of the upper shell 21 while at the same time maintaining pneumatic connection between the pipe 52 and air ducts formed in the shell. Ducts 61 lead from the interior of shell 21 at the upper central point thereof through the boss 33 to one end of an air pipe 62 which is connected at 63 to the flexible hose 52a. An annular recess 69 in the lower face of the plate 23 is connected by a duct 64 to the other end of the air pipe 62, and is thereby placed in pneumatic connection with the flexible hose 52a for the application of air pressure or air suction.

The pipe 53 is branched at 65. One branch pipe 53a leads to an air duct 66 which is formed in plate 18 and the boss 25 and opens into the interior of the lower shell 22. The other branch pipe 53b leads to an air duct 67 formed in the plate 24 which communicates pneumatically with an annular recess 68 in the upper face of the plate 24. By this arrangement of pipes and ducts either air pressure or air suction can be applied simultaneously to the interior of the shells 21 and 22 and recesses 68 and 69.

A foraminous rubber diaphragm 70 is disposed in horizontal position across the rim of the lower shell 22, and the periphery 71 of this diaphragm is secured between a fastening ring 72 and an annular recess 73 in the plate 24 by means of screws 74. A similar foraminous rubber diaphragm 75 is disposed in horizontal position across the rim of the upper shell 21, and its peripheral portion 76 is secured between a fastening ring 77 and an annular recess 78 in the plate 23 by means of screws 79. These rubber diaphragms are perforated as at 80 and 81 respectively (see Figs. 5 and 6). They are made with a progressively increasing thickness from periphery to center, the correlation of tensile strength and thickness being such that when the diaphragm is caused to assume a hemispherical position in contact with the inner face of its corresponding shell, any given portion of the surface of the diaphragm will increase in area in substantially the same ratio as any other surface portion.

Four annular suction recesses 82 are provided in the lower face of the upper plate 23, one at each corner thereof. These suction recesses are pneumatically connected to the annular recess 69 by air ducts 83.

In the operation of the machine, the upper hemispherical shell is elevated by admitting air under pressure to the lower end of the cylinder 41. A sheet 84 of stock rubber (see Fig. 8) of uniform thickness is placed in position on top of and in contact with the lower diaphragm 70, extending over and substantially covering the lower plate 24. Another similar sheet of rubber 85 is manually held just beneath the upper diaphragm 75, with its coated side down. The valve lever 58 is then thrown to position to apply air suction simultaneously to the interior of the shell 22, to the annular recess 68, to the interior of the shell 21, to the annular recess 69, and the annular recesses 82. The vacuum set up within the recess 68 serves to hold the outer portions of the rubber sheet 84 immovable with respect to the plate 24. The remainder of the sheet of rubber is caused to adhere to the rubber diaphragm 70 without displacement relative thereto, by reason of the reduction below atmospheric normal of the air pressure within the shell, and the transmission of this subatmospheric pressure through the perforations 80 to the under surface of the sheet of rubber.

As the reduction of air pressure within the shell continues, the diaphragm 70 and the sheet of rubber 84 immovably attached thereto, move downward, until the diaphragm comes to rest in contact throughout its area with the inner face of the hemispherical shell. Due to its progressively increasing thickness from periphery to center, the diaphragm resists stretching to a progressively greater degree from periphery to center. The sheet of rubber is thereby caused to be stretched in progressively less degree from periphery to center. If the diaphragm is not used, the sheet of rubber when drawn to the bottom of the shell, will be progressively thinner from periphery to center. By disposing a diaphragm below the sheet of rubber to control in compensatory fashion the tensile forces which act to stretch the sheet of rubber in all directions as it is drawn into the shell, the sheet when it assumes its final position in contact with the inner face of the shell, is of substantially uniform thickness throughout its area.

At the same time that the sheet of rubber 84 is thus being drawn into position in such a manner as to stretch it to uniform thickness, the upper sheet of rubber 86 is in the same fashion and for the same reason being drawn up into position within the upper hemispherical shell. The small recesses 82 serve to hold the corners of the rubber sheet 86 in position against the action of gravity.

A ball center 85 of kapok or other desired material which has preferably been coated with rubber cement is then placed within the lower shell, resting upon the sheet of rubber 84. The pneumatic cylinder 41 is then operated to lower the upper shell until the peripheral portion of the sheet of rubber 86 contacts the peripheral portion of the sheet of rubber 84, and the central portion of the sheet of rubber 86 contacts the upper surface of the ball center 85. The pneumatic jack is preferably used at this juncture to apply sufficient pressure to unite the peripheral edges of the two sheets of rubber. Air pressure within the cylinder 41 is then released; sufficient air pressure is applied to the interior chambers of the two shells, and to the recesses 68 and 69, to release the kapok center, which is now provided with a rubber envelope of uniform thickness throughout; the pneumatic jack is used to elevate the upper shell; and the covered ball is removed to the next operation of its manufacture.

The projecting rim formed by the union of the two peripheral edges of the upper and lower pieces of the rubber cover of the ball is removed in any suitable manner. Fig. 7 shows an alternative form of the invention in which a convenient means is provided for removing this projecting rim at the time the cover parts are applied. The periphery 76' of a diaphragm 75', is secured between the inner lateral wall of the annular recess 73' in the plate 23' and a fastening ring 77' seated within the recess. This fastening ring projects slightly from the face of the plate 23', and co-acts with a similar fastening ring 72', to sever the marginal portions 87, 88 of the upper and lower sheets of rubber 86' and 84' respectively from the ball, when the shells 21' and 22' are brought together.

One embodiment of the invention is shown and described herein. The invention is applicable to a wide variety of uses, and under any conditions in which a sheet of rubber or other material having the physical properties of rubber is in a manufacturing process or other manipulation caused to undergo a change of curvature whereby its thickness is changed in varying degrees at different points of its area. Certain features of the invention may be used independently of other features, and such independent use is within the scope of the invention.

We claim as our invention:

1. In a machine for applying a rubber envelope to a ball, the combination of: two hemispherical formers mounted with their open sides facing each other, each of said formers being provided with an annular face adapted to contact the annular face of the other of said formers, and each of said faces being provided with an annular recess; means for moving said formers into registering contact and for separating said formers; a foraminous diaphragm of elastic material mounted across the open side of each of said formers with its peripheral portion in air-tight relationship with said annular face of its associated former and with its periphery spaced radially inwardly from said annular recess; and means for establishing subatmospheric pressure simultaneously within said recesses and said formers.

2. A method of applying a rubber envelope to a ball, comprising the steps of: initially securing the peripheral portion of a sheet of rubber against movement with respect to the center of said sheet; subsequently deforming the central portion of said sheet from a plane to a hemisphere, and simultaneously providing resistance to the tensile stresses thereby set up within said sheet, said resistance being provided in a progressively increasing degree from periphery to center of said central portion, and said resistance being other than that afforded by the material of said sheet; similarly operating upon a second sheet of rubber; applying said two hemispherically shaped sheets upon opposite sides of a ball; securing said sheets to said ball; and withdrawing said resistance.

3. A method of applying a rubber envelope to a ball, comprising the steps of: initially securing the peripheral portion of a sheet of rubber against movement with respect to the center of said sheet; subsequently deforming a circular central portion of said sheet from a plane to a hemisphere, the periphery of this central portion being annularly spaced from said peripheral portion; simultaneously providing resistance to the tensile stresses thereby set up within said sheet, said resistance being provided in a progressively increasing degree from periphery to center of said central portion, and said resistance being other than that afforded by the material of said sheet; similarly operating upon a second sheet of rubber; applying said two hemispherically shaped sheets upon opposite sides of a ball; securing said sheets to said ball; and withdrawing said resistance.

4. In a machine for applying elastic material in sheet form to spheroidal objects, the combination of: an open-sided former having a spheroidal cavity and an annular edge face extending laterally away from the edge of said cavity; a foraminous diaphragm of elastic material peripherally secured to said former in position across the open side of said former, the thickness of said diaphragm increasing progressively from periphery to center; means for peripherally securing a sheet of elastic material to said annular edge face; and a means for establishing sub-atmospheric pressure within the chamber between said former and said diaphragm.

5. In a machine for applying elastic material in sheet form to spheroidal objects, the combination of: an open-sided former having a hemispheroidal cavity and an annular edge face extending laterally away from the edge of said cavity; a foraminous diaphragm of elastic material mounted across the circular open side of said former, and peripherally secured to said annular edge face at points radially outwardly from the edge of said cavity, the thickness of said diaphragm increasing progressively from periphery to center; annular means on said annular edge face and radially outwardly from said points for securing a sheet of elastic material contiguously upon said diaphragm; and means for establishing sub-atmospheric pressure within the chamber between said former and said diaphragm.

6. In a machine for applying elastic material in sheet form to spheroidal objects, the combination of: an open-sided former having a hemispheroidal cavity and an annular edge face extending laterally away from the edge of said cavity; a foraminous diaphragm of elastic material mounted across the circular open side of said former, and peripherally secured to said annular edge face at points radially outwardly from the edge of said cavity, the thickness of said diaphragm increasing progressively from periphery to center; annularly arranged recess means on said annular edge face and radially outwardly from said points for securing a sheet of elastic material contiguously upon said diaphragm; and means for establishing sub-atmospheric pressure within the chamber between said former and said diaphragm and in said annular recess means.

7. In a machine for applying a rubber envelope to a ball, the combination of: two formers mounted in axial alignment with their open sides facing each other, each having a hemispheroidal cavity and an annular edge face extending laterally away from the edge of said cavity; two foraminous diaphragms of elastic material mounted across the circular open sides of said formers respectively, and peripherally secured to said annular edge faces at points radially outwardly from the edge of said cavities, the thickness of said diaphragms increasing progressively from periphery to center; annular recess means on each of said annular edge faces disposed radially outwardly from said points for securing a sheet of elastic material contiguously upon each of said diaphragms respectively; means for establishing sub-atmospheric pressure within said cavities and said annular recess means; and means for moving said formers together with their open sides in registry and for separating said formers.

WILLIAM J. VOIT.
LEITH C. WEIMER.